United States Patent [19]

Corsi

[11] Patent Number: 5,286,146
[45] Date of Patent: Feb. 15, 1994

[54] OPERATING HEAD FOR AUTOMATIC MACHINE TOOLS WITH CHUCK SUPPORT ANGULAR LOCKING DEVICES

[75] Inventor: Armando Corsi, Piacenza, Italy
[73] Assignee: JOBS S.p.A., Piacenza, Italy
[21] Appl. No.: 950,408
[22] Filed: Sep. 23, 1992

[30] Foreign Application Priority Data

Oct. 14, 1991 [IT] Italy .............................. 000012 A/91

[51] Int. Cl.⁵ .............................................. B23C 1/12
[52] U.S. Cl. .................................... 409/201; 409/211; 409/231
[58] Field of Search ............... 409/201, 211, 216, 231, 409/232

[56] References Cited

U.S. PATENT DOCUMENTS

| | | | |
|---|---|---|---|
| 3,460,435 | 8/1969 | Hucks et al. | 409/230 |
| 3,483,796 | 12/1969 | Galbarini et al. | 409/216 |
| 4,313,478 | 2/1982 | Suzuki | 409/201 |
| 4,904,131 | 2/1990 | Affaticati | 409/216 |

FOREIGN PATENT DOCUMENTS

| | | | |
|---|---|---|---|
| 1253996 | 11/1967 | Fed. Rep. of Germany | 409/211 |
| 241382 | 12/1986 | German Democratic Rep. | 409/230 |
| 171239 | 10/1983 | Japan | 409/216 |
| 222809 | 9/1989 | Japan | 409/211 |
| 178709 | 8/1991 | Japan | 409/231 |

*Primary Examiner*—Daniel W. Howell
*Attorney, Agent, or Firm*—Notaro & Michalos

[57] ABSTRACT

This invention relates to an operating head for automatic machine tools of the type consisting of a fork with several degrees of freedom to which the support of a chuck is hinged, which can rotate arond an axis passing through the arms of the fork. In accordance with the invention clamping devices are provided, designed to lock the support of the chuck in any angular position to the fork, to perform power tasks with high precision.

3 Claims, 3 Drawing Sheets

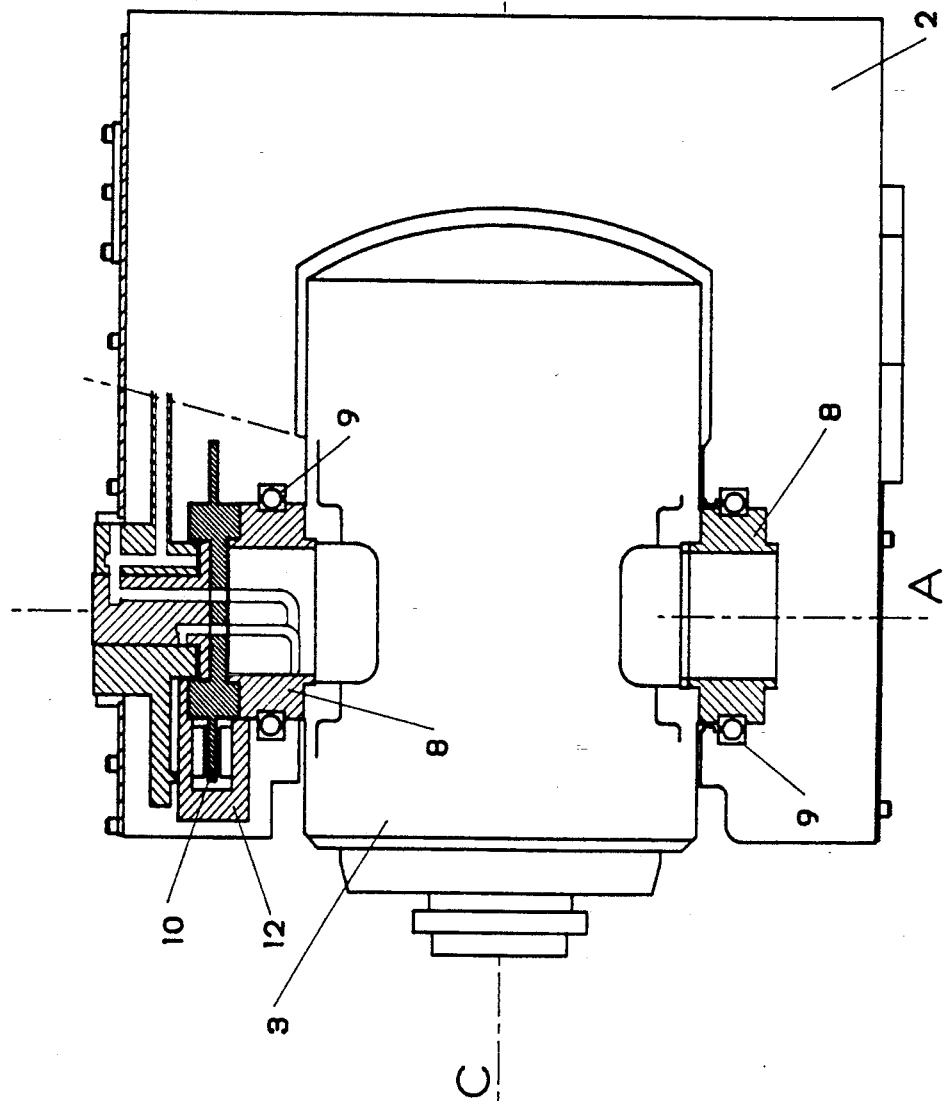

OPERATING HEAD FOR AUTOMATIC MACHINE TOOLS WITH CHUCK SUPPORT ANGULAR LOCKING DEVICES

This invention relates to an operating head for automatic machine tools which contains devices designed to lock the chuck support (or fifth axis) in an angular position.

In particular, it relates to an operating head of the type comprising a fork mounted on a sleeve which moves along a number of cartesian axes. The said fork can rotate around the sleeve axis, and the support of a chuck which can rotate, controlled by numerical control devices, around an axis which passes through the fork arms (fifth axis or Axis A), is hinged to it.

To enable the fifth axis (Axis A) to be used as a positioning axis in order to perform tasks which require both considerable power and high precision, the invention is designed so that the chuck support can be locked in any angular position by collets which act on devices built into the said support.

It is thus possible to work with a tool, such as a milling cutter, inclined in any position, while remaining within extremely fine tolerances. Automatic machine tools are already known which feature an operating head with five or more degrees of freedom of the type consisting of a fork which is fitted to a support designed to move along three cartesian axes (x, y and z) and which can itself rotate around an axis parallel to one of the said cartesian axes, a chuck support designed to rotate around an axis passing through the fork arms being fitted to the said fork.

All these movements are obviously regulated by numerical control.

When a tool such as a milling cutter is fitted to the chuck, the machine can perform the required tasks automatically, by moving all axes simultaneously. Operating heads of this kind are described, for example, in the Italian patent 1.220.733 held by this Applicant.

In the case of special manufacturing requirements, the fifth axis (Axis A) is sometimes used not as a working axis but as a positioning axis; in other words, the chuck support is maintained in the required angular position and the other axes are moved under numerical control.

Under these circumstances the tool operates under less than ideal conditions because the milling cutter, for example, is not perfectly perpendicular to the surface and is therefore subject to higher reaction forces than planned, these being passed on to the preceding devices which leads to imprecision, largely due to the play of the transmission gear.

In order to eliminate this difficulty, this invention offers an operating head for automatic machine tools characterised by the fact that it includes devices designed to lock the chuck support in the required angular position, thus enabling tasks to be performed with the tool inclined at any angle without loss of precision.

In particular, the operating head in accordance with the invention is fitted with collets designed to clamp a part such as a disc or a cogwheel built into the chuck support in order to lock the said support in the required position.

This invention will now be described in detail, by way of example but not of limitation, by reference to the annexed figures in which:

FIG. 3 is a view in partial cross-section of a further preferred version of the head in acordance with the invention;

Figure 1:
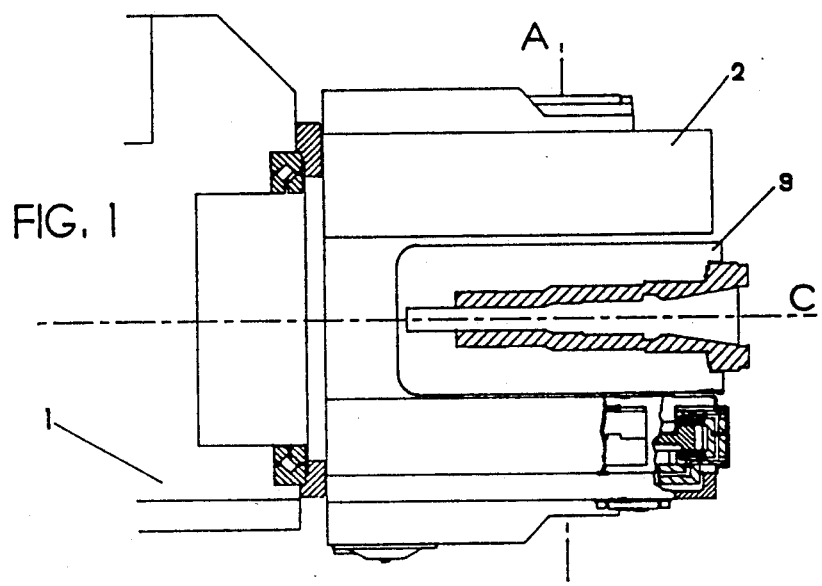
FIG. 1 is a view in partial cross-section of an operating head in accordance with the invention.
Figure 1A:
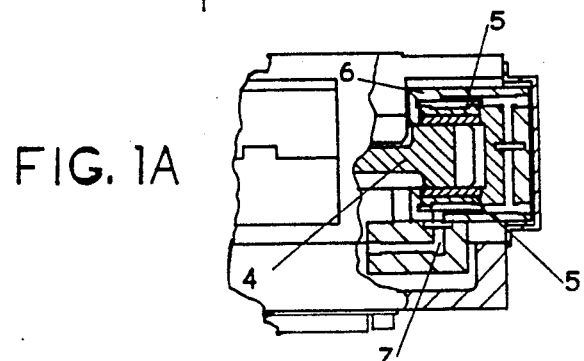
FIG 1A is a view of a section of FIG. 1.
Figure 2:
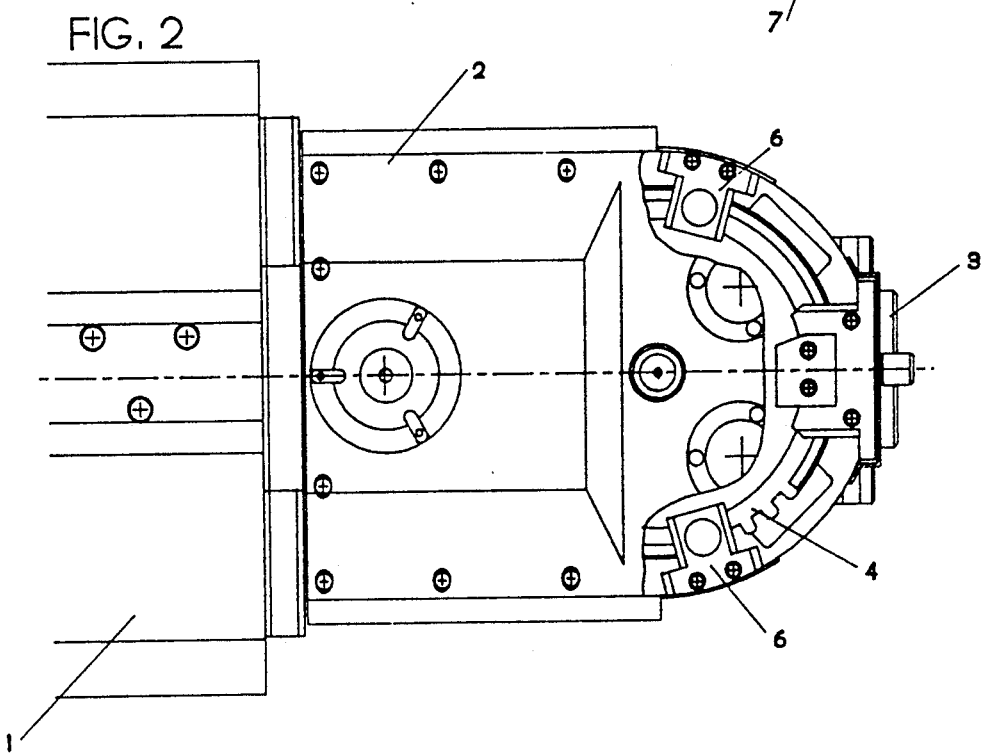
FIG. 2 is a view in partial cross-section of the head shown in FIG. 1, at right angles to the direction shown in the previous figure.

A preferred embodiment of the operating head in accordance with the invention is illustrated in FIGS. 1 and 2. In the figures, no. 1 indicates the sleeve on which fork 2 of the operating head is mounted, a chuck 3 being fitted between its arms.

The fork can rotate around axis C of the sleeve, while the chuck can rotate around axis A at right angles to the fork arms.

Both these movements, like all the other movements of the machine, are numerically controlled.

In particular, the rotation of the chuck around axis A is controlled by a motor housed in the sleeve (which is not illustrated in the figure) via drive gear located in one of the fork arms.

All these devices are described, for example, in Spanish patent 8800942 held by this Applicant, and are therefore not illustrated in detail.

The motion is transmitted by the motor housed in the sleeve to a cogwheel 4 whose axis coincides with axis A; the said cogwheel is integral with chuck 3 which consequently rotates with it.

A number of facing pads 5, made of material with a high friction coefficient and fitted to a collet 6 which is inserted around the circumference of cogwheel 4, act on the sides of chuck 3.

A pressurised fluid is conveyed to pads 5 along a pipe 7, pressing them from opposite directions against the sides of the cogwheel, which thus remains firmly locked.

As a result of this system, once the tool angle has been regulated by rotating cogwheel 4 and therefore chuck 5, the chuck can be firmly locked in the angular position set, and can also perform power tasks with the necessary precision.

Figure 5:
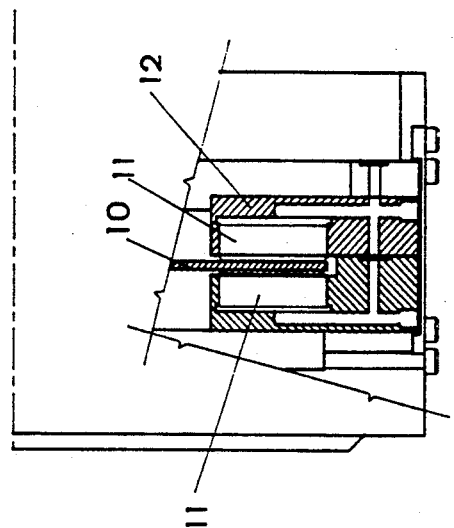
FIG. 5 is a cross-section along line 5—5 in FIG. 4.
Figure 4:
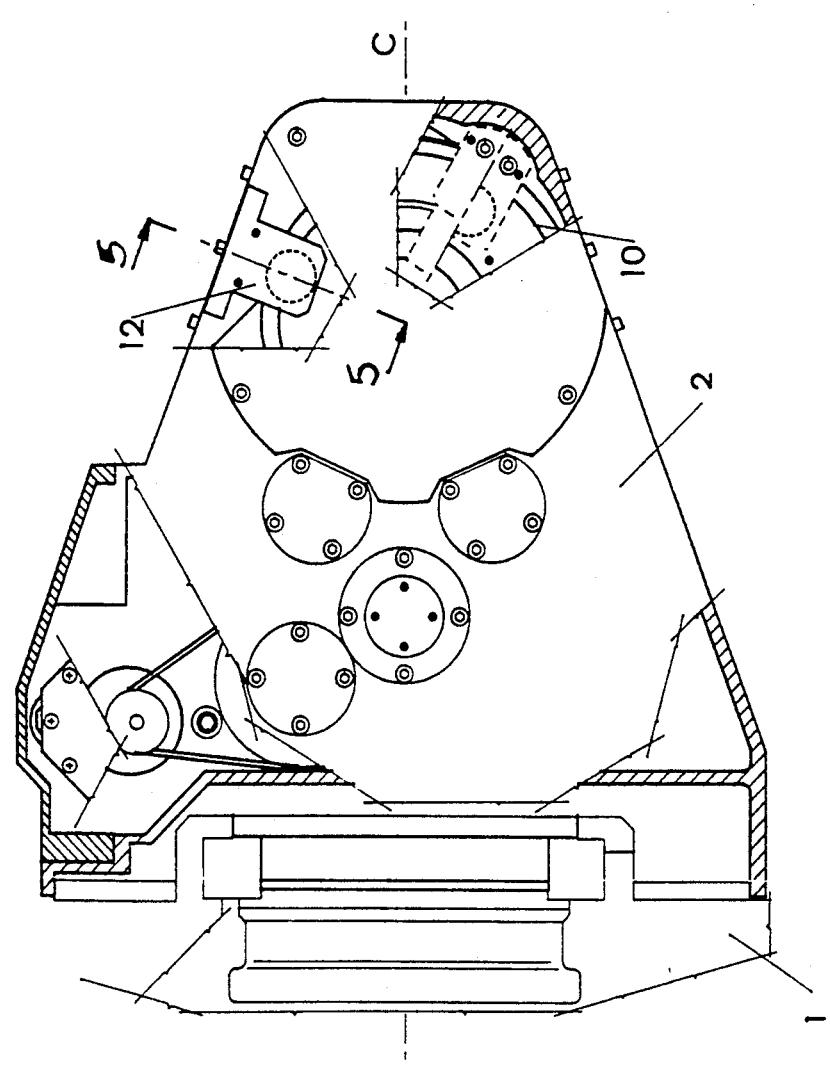
FIG. 4 is a view in partial cross-section of the head shown in FIG. 3, at right angles to the direction shown in the previous figure.

FIGS. 3 to 5 illustrate another preferred version of an operating head in accordance with the invention.

Here again, the head is fitted with a fork 2 equipped with a chuck 3 which can rotate around an axis A passing through the fork arms.

An operating head of this kind is described in U.S. Pat. No. 4,904,131 held by this Applicant.

In the case of the invention a flange 8, fitted on bearings 9 to one arm of the fork, is built into each side of chuck 3.

A disc 10 which might be made, for example, of steel, is fixed to one of these flanges, and pairs of pads 11, mounted on collets 12 and driven hydraulically, operate to clamp disc 10 from opposite sides.

Here again, as in the previous case, chuck 3 can be locked at any angle to the fork by simply clamping pads 11 against the disc.

The advantages of the invention clearly appear from the description supplied.

As it includes devices designed to lock the chuck support in rotation, axis A can be used as a positioning axis in order to perform power tasks with the tool in the most appropriate position, while still maintaining the high-precision characteristics of this kind of machine.

The invention is therefore characterised by the fact that it includes devices made of material with a high friction coefficient designed to clamp a rotating element integral with the chuck in order to lock it in any angular position.

I claim:

1. An operating head for automatic machine tools comprising:
    a rotatable fork having a pair of arms;
    a chuck rotatably fitted to the fork, the chuck rotatable about an axis, the axis passing through the arms of the fork;
    a cogwheel built into the chuck; and
    locking means built into the fork for locking the chuck into any angular position around the axis, the locking means including a plurality of collets each having a pair of pads for contacting the cogwheel, the pads being made of a high friction material for pressing against the cogwheel, and hydraulic means connected to the collets for pressing the pads against the cogwheel.

2. An operating head for automatic machine tools according to claim 1, wherein the cogwheel which is built into the chuck is mounted for rotating the chuck around the axis.

3. An operating head for automatic machine tools according to claim 2, wherein the locking means is built into one of the arms of the fork for locking the chuck into any angular position around the axis.

* * * * *